(12) United States Patent
Zemlin et al.

(10) Patent No.: US 7,040,489 B2
(45) Date of Patent: May 9, 2006

(54) OBJECT ORIENTING AND SORTING APPARATUS

(75) Inventors: Karl E. Zemlin, Indianapolis, IN (US); Larry W. Ellis, Cattaraugus, NY (US)

(73) Assignee: Alcoa Closure Systems International, Inc., Indianapolis, IN (US)

( * ) Notice: Subject to any disclaimer, the term of this patent is extended or adjusted under 35 U.S.C. 154(b) by 229 days.

(21) Appl. No.: 10/683,380

(22) Filed: Oct. 10, 2003

(65) Prior Publication Data

US 2005/0077216 A1    Apr. 14, 2005

(51) Int. Cl.
*B65G 47/44* (2006.01)
*B07C 9/00* (2006.01)

(52) U.S. Cl. .................. 209/691; 209/923; 209/924; 198/550.2; 198/384; 198/456

(58) Field of Classification Search ............... 198/523, 198/524, 530, 532, 533, 535, 540, 541, 546, 198/550.2, 690.2, 861.1, 384, 443, 456; 209/643, 209/691, 910, 923, 924
See application file for complete search history.

(56) References Cited

U.S. PATENT DOCUMENTS

| 2,954,862 | A | | 10/1960 | Clark |
| 3,776,346 | A | | 12/1973 | Dubuit |
| 4,006,812 | A | * | 2/1977 | Everett et al. ........... 198/347.1 |
| 4,081,069 | A | * | 3/1978 | Ono .......................... 198/381 |
| 4,104,966 | A | | 8/1978 | Ackley, Jr. et al. |
| 5,038,914 | A | | 8/1991 | Cotic et al. |
| 5,394,972 | A | * | 3/1995 | Aidlin et al. ............... 198/393 |
| 5,444,526 | A | * | 8/1995 | Echapare Ibarrola et al. . 356/71 |
| 6,116,407 | A | * | 9/2000 | Zolicoffer et al. .......... 198/530 |

FOREIGN PATENT DOCUMENTS

DE           37 42 728 C1    12/1987

* cited by examiner

*Primary Examiner*—Donald P. Walsh
*Assistant Examiner*—Mark J. Beauchaine
(74) *Attorney, Agent, or Firm*—Greenberg Traurig, LLP

(57) ABSTRACT

An object sorting and orienting apparatus is for sorting, orienting and discharging a plurality of objects, such as, container closures dispensed from a hopper. An endless conveyor transports the closures from a loading area, through an intermediate area, to a discharge area. At least one regulator, including an adjustable spill-plate, regulates the effects of object fill-level within the hopper during a sorting run. Orienting means, including an extension of the adjustable spill-plate and a plurality of flights on the endless conveyor, arrange the closures in a correct orientation. Sorting means, including a belt path disruptor and a substantially vertical belt path, sort incorrectly oriented closures from correctly oriented closures. Discharge means, including a removal device and at least one discharge chute, discharge correctly oriented closures from the discharge area.

30 Claims, 11 Drawing Sheets

OBJECT ORIENTING AND SORTING APPARATUS

BACKGROUND OF THE INVENTION

1. Field of the Invention

The present invention relates generally to apparatus for orienting a plurality of objects and, more particularly, to a sorting and orienting apparatus for closures for containers.

2. Background Information

Closures for containers, such as, for example, bottle caps and jar lids typically have an asymmetrical shape with a top or flat surface having sides protruding from the underside thereof to form a shallow cup-like shape.

Before such closures are used, for example, during automated bottling or food packaging processes, the closures must be accurately sorted and oriented. A variety of automated sorting machine designs have been employed in an attempt to sort and orient closures in the most efficient manner possible. Efficient sorting requires proper orientation and transport of the maximum number of closures possible while effectively sorting to remove incorrectly arranged closures and simultaneously preventing jamming as the correctly oriented closures are delivered, and performing all of these functions throughout the entire duration of a particular sorting run.

Known prior art sorting machines use a variety of mechanisms and techniques to correctly orient closures while sorting out incorrectly oriented closures (i.e., closures that are improperly arranged in the sorting area, such as, for example, overlapping, upside down or otherwise incorrectly situated closures).

A few of these sorting machines include a large hopper for holding a quantity of closures and distributing them onto a conveyor belt, and utilize gravity and the geometry of the closures to facilitate sorting. Maintaining proper depth of the closures during loading onto the conveyor belt is critical to optimize sorter efficiency. Known prior art hopper designs exhibit a large variation in performance efficiency as the hopper diminishes its load of closures during the sorting run, from when the hopper is full of closures to the end of the sorting run when the hopper is nearly empty.

Adjusting the sorter to sort a different closure type or size often requires a different conveyer flight design. Flights are projections or the sections of the conveyor belt structured to retain a closure in the proper orientation. A conveyer flight is dimensioned based on specific closure properties. Existing methods of changing the flights are very time consuming, requiring the use of tools and involving a lot of effort. Additionally, existing belt-type sorter designs maintain an inclined belt path, causing the size of the sorter footprint, or base dimension, to expand as the path is extended to accommodate different closure shapes and sizes. This also requires support structure well beyond the boundaries of the base or footprint of the machine, thereby unnecessarily occupying extra floor space or work area.

Once closures near the top of the sorter conveyor belt path they must be removed from the conveyor belt. Known methods of closure removal include, for example, sweeper bars and high-pressure compressed-airjets. However, sweeper bar methods can be slow and are prone to jamming and compressed air is very loud, inefficient and poses contamination issues. Other designs use an adjustable disruption in the belt path to dislodge improperly oriented caps. However, such a feature typically involves numerous bearings and other moving parts, as well as tedious adjustment mechanisms.

Improperly oriented closures often fall off the flights as they are carried on the conveyor belt to the discharge area at the top of the sorting machine. Falling closures can knock properly oriented closures off the conveyor belt near the loading area thus reducing the overall efficiency of the sorter. Many sorters have overflow paths that allow closures to drop down a chute and back into the bulk hopper. Typically, such overflow paths comprise a long corrugated hose. Such hoses are difficult to clean and inspect. Additionally, allowing closures to make multiple passes through the sorter increases the chance of damage and/or contamination of the closures.

U.S. Pat. No. 5,394,972 (Aidlin et al.) discloses a variable angle conveyer assembly. The patent recites a conveying system for lifting and orienting bottle caps comprising a conveyor belt which is formed with articulating sections. The belt has an upper lifting section with an essentially vertical path of travel and a lower loading section with an angled path of travel. The assembly includes a complex swing-arm arrangement to displace the belt path. The swing-arm includes a shaft having ball-bearings to facilitate rotation and a plurality of sprockets in contact with the interior face of the conveyor belt near the bottom of the upper section, in order to form an outwardly directed bow in the belt. The bow facilitates removal, by gravity, of bottle caps not in the proper orientation on the conveyer belt. Adjustment of this mechanism requires the use of tools, such as, for example, a wrench. The bottle caps are initially disposed in a hopper located proximate the loading section of the conveyer belt. At the bottom of the hopper is a baffle plate with holes on the sides to permit caps to be loaded onto the conveyer belt while the center of the baffle plate supports the pressure of the caps in the hopper. However, this hopper design results in a variation of the level of caps dispensed to the loading section corresponding to variations in the fill-level (i.e., the number of caps in the hopper). Accordingly, optimal sorter performance cannot be maintained throughout the full operating range as the hopper fill-level diminishes. The assembly also includes a pressurized fluid source such as compressed-air to pneumatically eject bottle caps from the conveyer belt.

There is room for improvement in the art of object sorting and orienting and in closure sorting and orienting apparatus.

SUMMARY OF THE INVENTION

Accordingly, it is an object of the present invention to provide a simplified orienting and sorting apparatus that will increase the efficiency with which objects, such as, for example, closures are oriented and sorted.

It is a further object of this invention to provide tool-free adjustment of the sorting and orienting apparatus and to eliminate complex, unnecessary and costly parts, such as, for example, bearings, lubrication points, sprockets and rotating parts.

It is another object of the present invention to increase the number of closures loaded in the loading area and transported to the discharge area and to maintain consistent closure disbursement throughout an entire sorting run, beginning when the hopper is full of closures until it is nearly empty.

It is yet another object of this invention to provide an orienting and sorting apparatus having a substantially vertical belt path and comprising standardized components, thereby reducing operating and maintenance costs, simplifying adjustment, and providing a uniform footprint, or base dimension of the apparatus, thereby staying within a predetermined amount of floor area or workspace regardless of adjustments made to the apparatus.

It is another object of this invention to employ air-conveying principles to remove closures from the endless conveyor belt, thereby providing cleaner, quieter, more energy efficient discharge of correctly oriented closures while avoiding mechanical contact with such closures thus minimizing the possibility of damage thereto.

It is a further object of the present invention to employ a closure discharge assembly structured to prevent jamming of closures being discharged.

It is yet another object of the present invention to minimize the likelihood of closures being cycled through the sorting and orienting apparatus more than once, thereby greatly reducing the likelihood of closure damage and/or contamination.

It is a further object of this invention to provide a means for preventing falling closures from knocking correctly oriented closures off of the endless conveyer belt therebelow, and, additionally to direct them back to the loading area.

It is another object of this invention to provide a sorting and orienting apparatus capable of readily sorting a wide variety of closures without requiring a costly or time consuming exchange of parts, but rather providing tool-free adjustment.

These needs and other are satisfied by the present invention, which provides, among other things, an object orienting and sorting apparatus including tool-free adjustment, simplified construction, regulated closure dispersement, jamming resistance and maximized closure loading, orienting, sorting, transport and discharge.

As one embodiment of the invention an object sorting and orienting apparatus comprises: a hopper for receiving and dispensing a plurality of randomly oriented objects, the plurality of objects defining an object-fill level within the hopper; an endless conveyor rotating through a loading area, a discharge area and an intermediate area therebetween, the endless conveyor receiving the objects at the loading area and transporting the objects to the discharge area, each object being loaded onto the endless conveyor in one of a correct orientation and an incorrect orientation; at least one regulator for regulating the effects of variations in the object fill-level within the hopper during of a sorting run; orienting means for arranging the objects in the correct orientation; sorting means for sorting the incorrectly oriented objects from the correctly oriented objects; and discharge means for discharging the correctly oriented objects from the discharge area.

The at least one regulator may include a hopper discharge forming an opening in the hopper structured to controllably dispense the randomly oriented objects from the hopper into the loading area, and, an adjustable spill-plate disposed between the opening in the hopper and the endless conveyor, the adjustable spill-plate being adjustable in order to further facilitate regulated dispensing of the objects onto the endless conveyer within the loading area.

The orienting means may include a plurality of flights disposed on the endless conveyor structured to receive a plurality of objects in the correct orientation. The orienting means may further include an extension of the adjustable spill-plate wherein the extension further extends into the loading area. The extension may contact the flights of the endless conveyor as the endless conveyor travels therebeneath sending an intermittent pulse through the extension, thereby facilitating uniform distribution of the objects from the adjustable spill-plate onto the endless conveyor within the loading area.

The endless conveyor may have a substantially vertical belt path between at least the intermediate and the discharge areas. The sorting means may include a belt path disruptor structured to displace the belt path proximate the intermediate area, in order that the belt path disrupter and gravity, induced by the substantially vertical belt path, facilitate removal of incorrectly oriented objects from the endless conveyor. The belt path disruptor may include an adjustment device comprising an eccentric shaft having a first end, a second end and a plurality of non-rotating guides disposed therebetween.

The discharge means may include at least one discharge chute proximate the discharge area and a removal device for removing correctly oriented objects from the endless conveyor for discharge from the sorting and orienting apparatus via at least one of the at least one discharge chute. The removal device may be an air-conveyor for removing correctly oriented objects without mechanical contact, thereby minimizing the potential for damage to the objects.

The sorting means may further include a deflecting mechanism proximate the loading area, the deflecting mechanism having a plurality of deflectors in order to prevent objects falling from the endless conveyor from hitting and knocking off objects on a different portion of the endless conveyor therebelow, thereby maximizing the number of objects dispensed and distributed onto the endless conveyor for transport from the loading area to the discharge area.

As another embodiment of the invention, a closure sorter and orienter comprises: a hopper for receiving and dispensing a plurality of randomly oriented closures, the plurality of closures defining an object fill-level within the hopper; an endless conveyor rotating through a loading area, a discharge area and an intermediate area therebetween, the endless conveyor receiving the closures in the loading area and transporting the closures to the discharge area, each closure being loaded onto the endless conveyor in one of a correct orientation and an incorrect orientation; at least one regulator for regulating the effects of variations in the object fill-level within the hopper during a sorting run, the at least one regulator including a hopper discharge forming an opening in the hopper for controllably dispensing closures from the hopper, and, an adjustable spill-plate for further regulating dispensing and distribution of the closures onto the endless conveyor within the loading area; orienting means for arranging the closures in the correct orientation, the orienting means including a plurality of flights disposed on the endless conveyor for receiving a plurality of correctly oriented closures, and, an extension for the adjustable spill-plate, the extension communicating with the hopper discharge and the flights of the endless conveyor in order to facilitate uniform distribution of the closures from the adjustable spill-plate onto the endless conveyor for transport from the loading area to the discharge area; sorting means for sorting the correctly oriented closures from the incorrectly oriented closures, the sorting means including a belt path disruptor proximate the intermediate area, in order to displace the endless conveyor thereby removing the incorrectly oriented closures therefrom, gravity further facilitating such removal; and discharge means for discharging correctly oriented closures from the discharge area of the sorting and orienting apparatus, the discharge means including a removal device adjacent the endless conveyor and at least one discharge chute for receiving and discharging correctly oriented closures single-file, the removal device removing correctly oriented closures from the endless conveyor and guiding the closures into at least one of the at least one discharge chute for discharge therethrough.

The closure sorter and orienter may be adjusted without the use of tools, in order to sort closures having a wide array of shapes and sizes.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
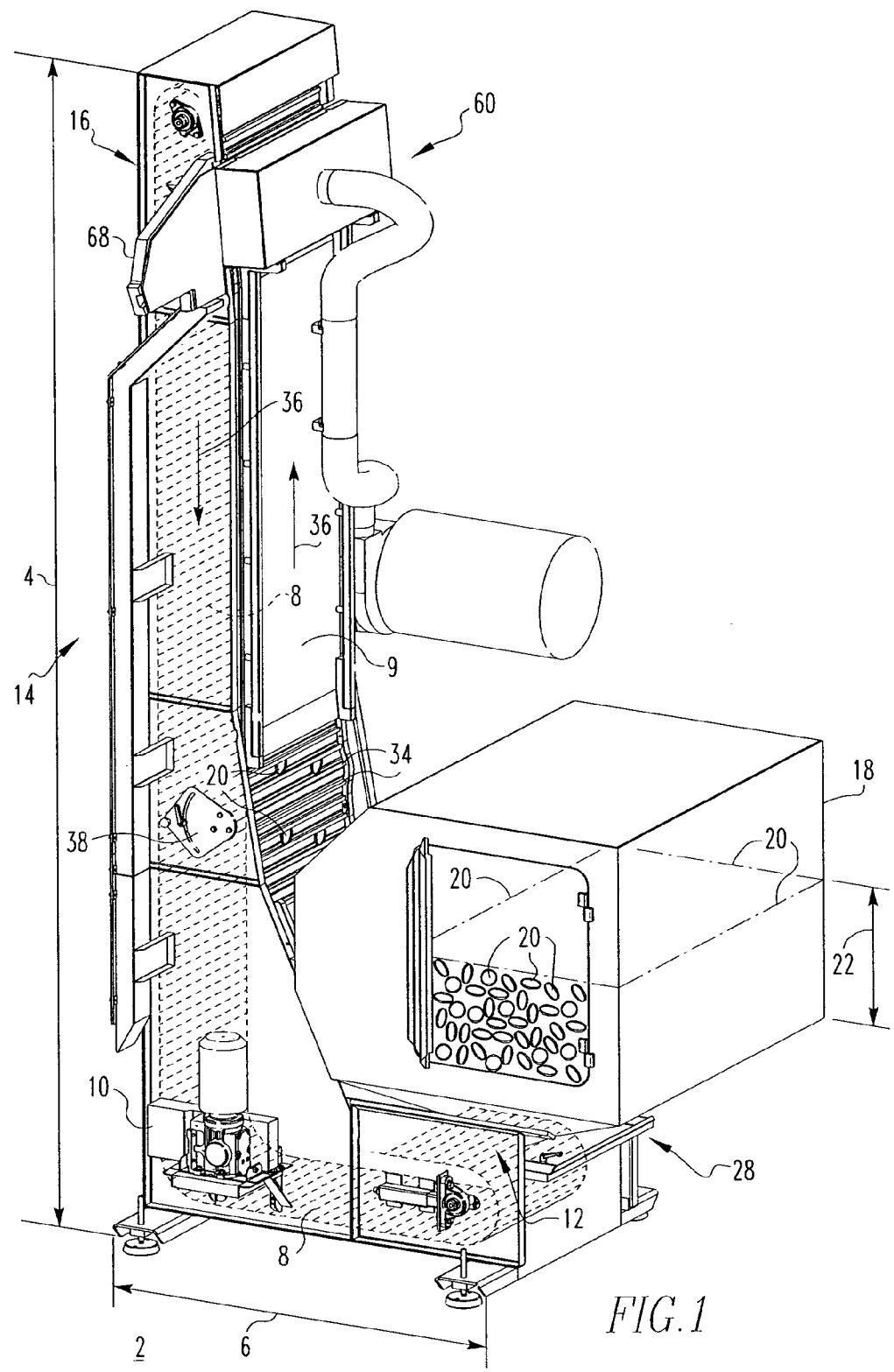
FIG. 1 is an isometric view of an object sorting and orienting apparatus in accordance with the present invention, with the endless conveyor shown schematically in phantom line drawing.

For purposes of illustration, the present invention will be described as applied to high-speed sorting and orientation of closures and more specifically, bottle caps, although it will become apparent that it could also be applied to other types of asymmetrical objects (e.g., without limitation, container closures; push-pull closures; twist-on closures), as well as a wide array of other objects, other than closures, and any combinations thereof, for which sorting and orienting is desired.

As employed herein, the term "object" refers not to a feature of the invention, but rather to the article being acted upon or sorted and oriented by the disclosed sorting and orienting apparatus. An object may include, for example, without limitation, container closures, bottle caps, jar lids or any other article or combination of articles for which sorting and orienting is desired. The objects may have a wide variety of shapes and sizes and may be made from a variety of materials (e.g., without limitation, metal; plastic).

As employed herein, the term "correct orientation" refers to an object arranged in a predetermined acceptable position on, for example, the endless conveyor belt or elsewhere within the sorting and orienting apparatus. For example, a typical closure such as a bottle cap has essentially two possible orientations, top-side up and top-side down. In the top-side up orientation the top or flat portion of the bottle cap faces away from the contact surface, for example the endless conveyor belt, while the opposite side or the cup-shaped portion faces and contacts the endless conveyor belt. The top-side down orientation is essentially the reverse, with the top of the bottle cap facing and contacting, for example, the endless conveyor belt while the opposite side, the cup-shaped portion, faces outwardly away from the endless conveyor belt. For purposes of the present invention, a "correctly oriented object" is one in the latter, top-side down orientation with its top contacting the endless conveyor belt. Accordingly, an "incorrectly oriented object," for purposes of the present invention, is one in the top-side up orientation or any other position other than top-side down (e.g., without limitation, overlapping bottle cap at least partially laying on top of another bottle cap).

As employed herein, "hopper" refers to the receptacle or bin which holds a plurality of randomly oriented objects, such as the exemplary closures, and which includes a hopper discharge opening for controllably dispensing such objects into the loading area of the sorting and orienting apparatus.

As employed herein, the term "object fill-level" refers to the depth of objects, for example, closures, which corresponds with the number of objects within the hopper. The object fill-level has an effect on the rate at which objects are dispensed from the hopper. For example, as the object fill-level decreases the weight within the hopper decreases thus causing a variation in the speed at which the objects are dispensed from the hopper.

As employed herein, the term "sorting run" refers to the duration of one complete sorting and orienting process. For example, a sorting run typically begins when the hopper is full of objects or the object fill-level is high, and is finished when the hopper is empty and all of the objects are correctly oriented. A typical sorting run sorts and orients a plurality of the same object, however, as discussed below, the exemplary sorting and orienting apparatus may be adjusted to sort and orient objects having a wide variety of shapes and sizes, as well as to sort and orient combinations of such objects.

As employed herein, the term "flights" refers to a series of projections on the endless conveyor belt. For example, a group of transverse substantially parallel projections or flights on the endless conveyor belt may be structured to receive a correctly oriented object therebetween, in order to transport the correctly oriented object from the loading area of the object sorting and orienting apparatus to the discharge area.

As employed herein, the term "air-conveyor" refers to an object moving device which, unlike compressed-air, utilizes high-volume and low-pressure via a pressurized plenum, in order to, for example, remove objects from the endless conveyor belt without mechanical contact. Air conveyors are quiet, and energy efficient, requiring approximately 40% of the energy of a single compressed-air nozzle. Known prior art sorting machines have required four such compressed-air nozzles to facilitate object removal.

As employed herein, the term "footprint" refers to the base dimension of the sorting and orienting apparatus. For example, the amount of floor space or work area that the present sorting and orienting apparatus requires for operation, defines its footprint.

As employed herein, the term "tool-free adjustment" refers to, for example, the ability to facilitate changes to the objecting sorting and orienting apparatus operating settings without requiring the use of tools. "Tools" refers not to a feature of the present invention, but rather to an article, such as, for example, without limitation, a wrench, a screwdriver, a pair of pliers or any combination thereof, commonly used to facilitate adjustment of a machine or device.

FIG. 1 illustrates the basic components of a sorting and orienting apparatus, such as, the exemplary closure sorting and orienting apparatus 2 shown. Such apparatus are typically employed within a series of processing equipment, for example, at the beginning of a bottling operations line, in order to provide correctly oriented and sorted closures for application to seal or close a bottle (i.e., supplying correctly oriented closures to a capping machine). However, it will be appreciated that the exemplary sorting and orienting apparatus 2 may be employed to perform any number of functions (e.g., without limitation, sorting and orienting new closures for later use to seal a container; sorting and orienting of new or used closures for packing of such closures into, for example, sleeves or boxes; sorting and orienting of closures for recycling purposes).

As shown, the exemplary sorting and orienting apparatus 2 has an adjustable height 4 and a substantially uniform footprint 6. A motor 10 or other suitable drive mechanism propels an endless conveyor 8 through a loading area 12 an intermediate area 14 and a discharge area 16. A loading bin or hopper 18 receives and holds a plurality of objects, such as, for example, closures like the exemplary bottle caps 20, shown. The closures 20 are initially supplied to the hopper 18 in random orientation. As shown, the hopper 18 has an object fill-level 22 corresponding to the quantity of closures 20 within the hopper 18. As discussed above, it will be appreciated that the closures 20 may have a variety of shapes (not shown), material compositions (not shown), and means of attachment (e.g., without limitation, threads or screw-on; press-fit; snap-on) (not shown). Additionally, as discussed above, other objects, (not shown) other than closures 20 having a variety of shapes and sizes (not shown) and being made from a variety of materials (not shown), may also be sorted using the exemplary object sorting and orienting apparatus 2. It will also be appreciated that any combination of objects and/or closures may be sorted by the exemplary sorting and orienting apparatus 2.

As employed, closures 20 are controllably dispensed through a hopper discharge 24 (FIG. 2) forming an opening 26 (FIG. 2) in the hopper 18 of the sorting and orienting apparatus 2. The closures 20 are dispensed onto an adjustable spill-plate 28 and then distributed onto the endless conveyor 8 within the loading area 12. The endless conveyor 8 then transports the closures 20 from the loading area 12 to the discharge area 16 as sorting and orienting processes, described in detail below, are performed on the closures 20. The correctly oriented closures 20 are then discharged from the sorting and orienting apparatus 2 for the desired future use. As shown, the exemplary object sorting and orienting apparatus 2 may optionally employ a shield 9 covering at least a portion of the endless conveyor 8. the exemplary shield 9 serves several purposes, including, for example, protecting the endless conveyor 8 and objects 20 being transported thereon, from being disrupted or damaged.

The exemplary object sorting and orienting apparatus 2 further includes at least one regulator for regulating the effects of variations in the object fill-level 22 within the hopper 18, orienting mechanisms for arranging the closures 20 into a predetermined acceptable or correct orientation, sorting mechanisms for separating incorrectly oriented closures 20 from correctly oriented closures 20, and discharge mechanisms for discharging the correctly oriented closures 20 for future use (e.g., without limitation, packaging; recycling; sealing containers).

The exemplary regulating mechanisms include, among other things, the hopper discharge 24 and opening 26 therein (FIG. 2), and the adjustable spill-plate 28. Known prior art hopper and sorting machine designs (not shown) do not employ such regulating mechanisms. Therefore, variations in the hopper object fill-level during a sorting run often result in uneven closure or bottle cap dispensing and distribution from the hopper to the endless conveyor. As sorting efficiency directly correlates with the number of closures or bottle caps dispensed and distributed at an appropriate speed and depth with the loading area of the endless conveyor, these prior art designs are relatively inefficient.

The exemplary hopper discharge opening 26 (FIG. 2) and adjustable spill-plate 28 combine to overcome these disadvantages by metering or regulating the dispensing of closures 20 from the hopper 18 into the loading area 12. The adjustable spill-plate 28 is in communication with the hopper discharge opening 26 and is adjustable, in order to control the rate at which closures 20 are dispensed from the opening 26, thereby providing substantially uniform dispersement throughout an entire sorting run, beginning when the hopper object fill-level 22 is full until the hopper 18 is nearly empty (not shown; the object fill-level 22 is approximately half-full in FIG. 1). Such regulated dispersement permits a maximum number of closures 20 to be effectively loaded onto the endless conveyor 8 within the loading area 12, thereby maximizing sorting and orienting efficiency. The exemplary regulating mechanisms are discussed in greater detail below.

The orienting mechanisms of the exemplary sorting and orienting apparatus 2 include, among other things, a plurality of flights 34 disposed on the endless conveyor 8 and structured to receive a plurality of closures 20. As shown, the exemplary flights 34 are transversely disposed, substantially parallel projections on the endless conveyor 8. However, it will be appreciated that any number of suitable flight type (not shown) or other suitable object-receiving apparatus or feature (not shown) may be alternatively employed to transport a variety of objects having a wide array of shapes and sizes (not shown). For example, quick-change flights (not shown), which are flights that are capable of being quickly adapted (e.g., without limitation, sliding flights movable on the endless conveyor to adjust the distance between flights closer or farther apart), without the use of tools, to accommodate a wide variety of objects (not shown) could alternatively be employed. Additionally, a different endless conveyor (not shown), having a different flight pattern (not shown), could be exchanged to accommodate changes in the objects being sorted.

The sorting mechanisms of the exemplary sorting and orienting apparatus 2, as discussed below, include, among other things, a belt path disrupter 38, described in detail below, which is structured to remove incorrectly oriented closures 20 from the endless conveyor 8. As shown, the exemplary endless conveyor 8 of the sorting and orienting apparatus 2 has a substantially vertical belt path 36 between the intermediate area 14 and the discharge area 16 of the endless conveyor 8. Gravity induced by the substantially vertical belt path 36, in combination with the belt path disrupter 38, facilitates sorting or removal of incorrectly oriented closures 20 from the endless conveyor 8, as discussed in detail below.

Known prior art belt-type sorting machines typically have a continuous inclined belt path from the loading area up to the discharge area, which requires significant design changes when adjustments must be made, for example, to accommodate a different size or shape of object to be sorted. The intermediate areas and footprints of such prior art machines must frequently be custom designed to provide for the variability that each installation dictates.

The substantially vertical nature of the exemplary endless conveyor 8 provides a solution to these problems by allowing the height 4 of the object sorting and orienting apparatus 2 to be easily adjusted without affecting other aspects of the apparatus 2, such as, for example, the footprint 6. This enables the exemplary object sorting and orienting apparatus 2 to maintain a predetermined and substantially uniform footprint 6 and floor space or work area throughout the entire operating range of the apparatus 2. It also uses, and permits the interchanging of, standardized, readily available sorting and orienting apparatus components.

Figure 8:
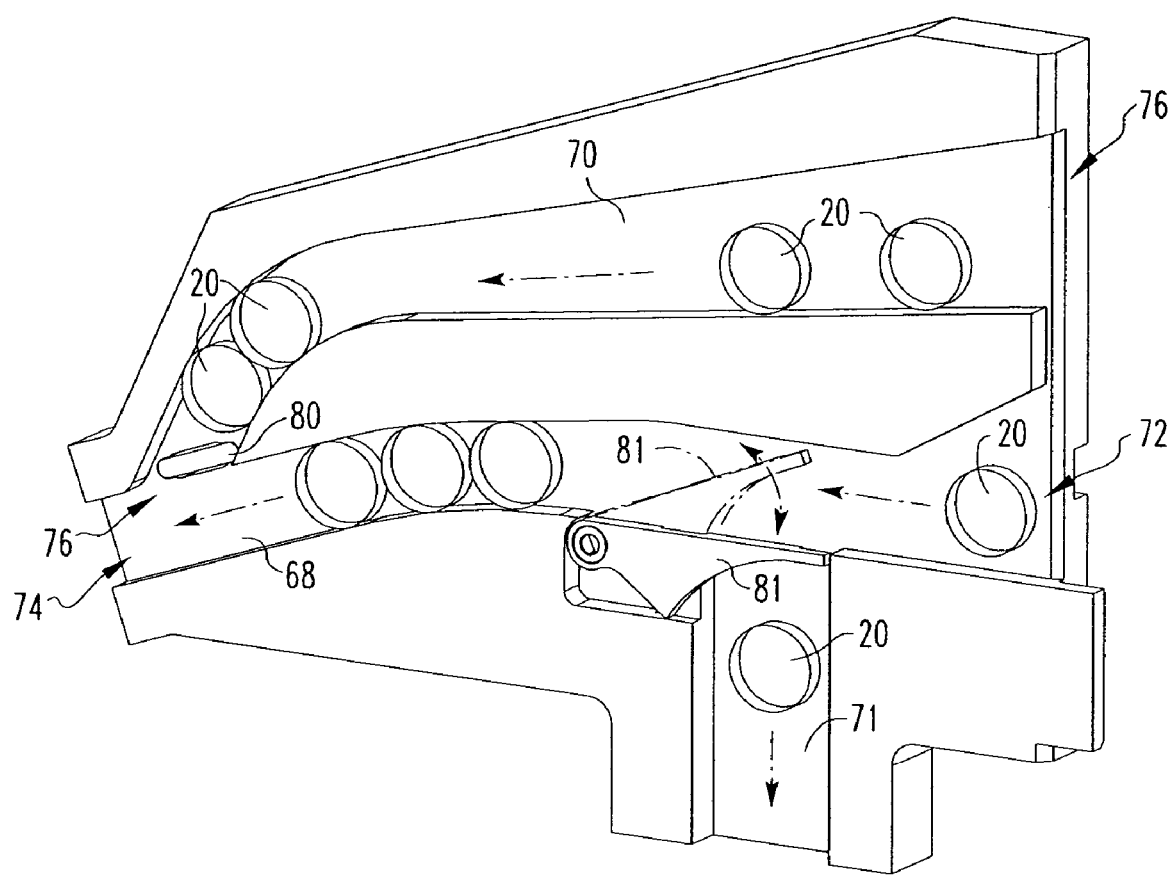
FIG. 8 is an isometric view of a discharge chute assembly for use with the object sorting and orienting apparatus of FIG. 1.
Figure 9:
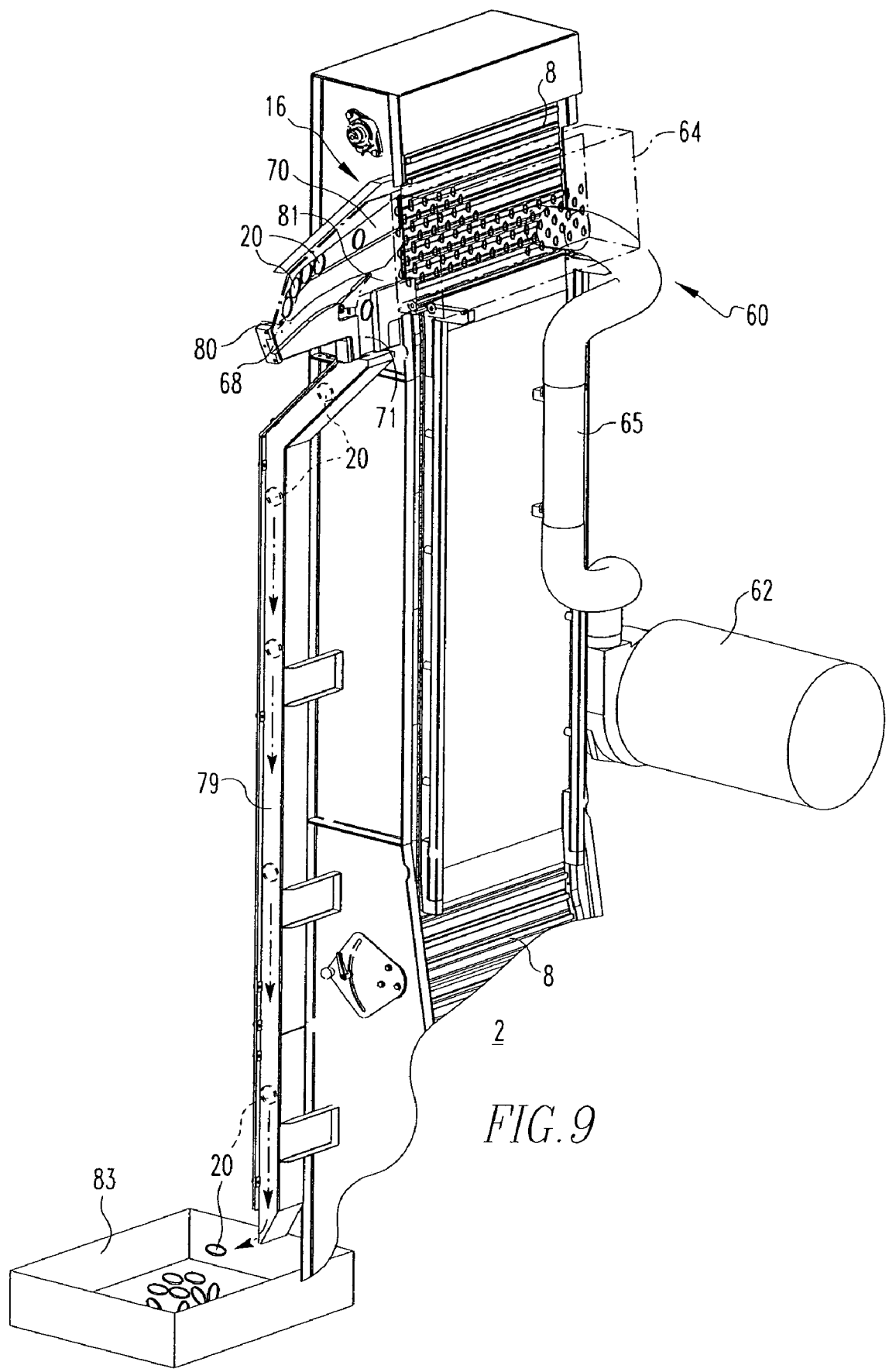
FIG. 9 is an isometric view of the discharge chute assembly of FIG. 8 as employed on the object sorting and orienting apparatus of FIG. 1, in accordance with the present invention.

Continuing to refer to FIG. 1, the discharge mechanisms of the exemplary object sorting and orienting apparatus 2 include, among other things, a removal device, such as the exemplary air-conveyor 60, shown and at least one discharge chute 68 (best shown in FIGS. 8 and 9). Each of the exemplary discharge mechanisms are discussed, in detail, below.

Figure 2:
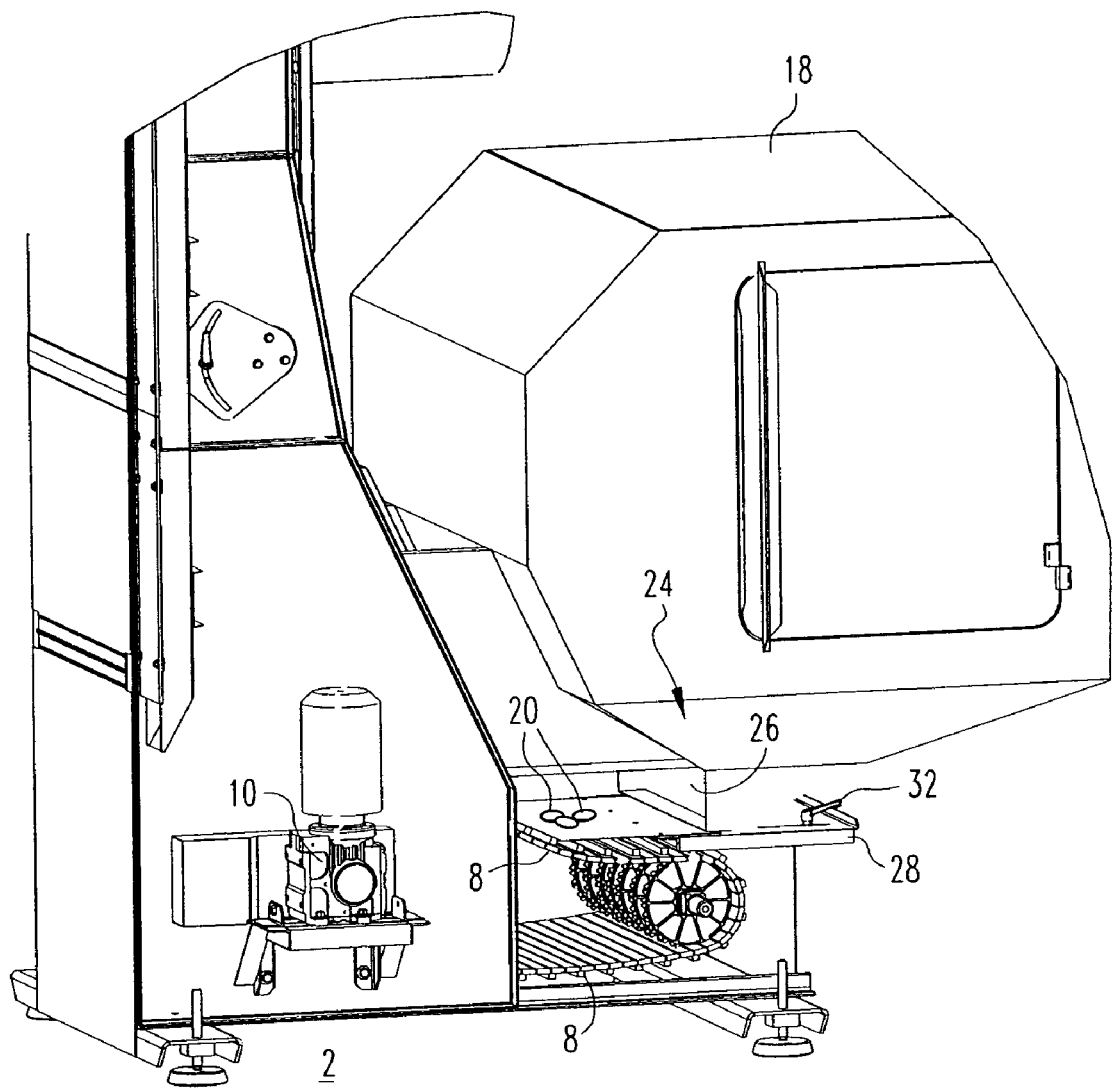
FIG. 2 is an isometric view of an adjustable spill-plate as employed with the object sorting and orienting apparatus of FIG. 1, in accordance with the present invention, with a portion of the apparatus cut-away to show internal structures.

FIG. 2 illustrates the exemplary adjustable spill-plate 28. As shown, the adjustable spill-plate 28 includes an extension 30 and as described above, provides tool-free adjustment to negate effects of varying object fill-level 22 (FIG. 1). To facilitate adjustment of the adjustable spill-plate 28, any suitable tool-free adjustment mechanism, such as, for example, the exemplary quick-release pins 32, shown, may be employed. The exemplary adjustable spill-plate 28 is disposed between the hopper discharge 24 and the endless conveyor 8 (best shown in FIG. 3).

Figure 3:
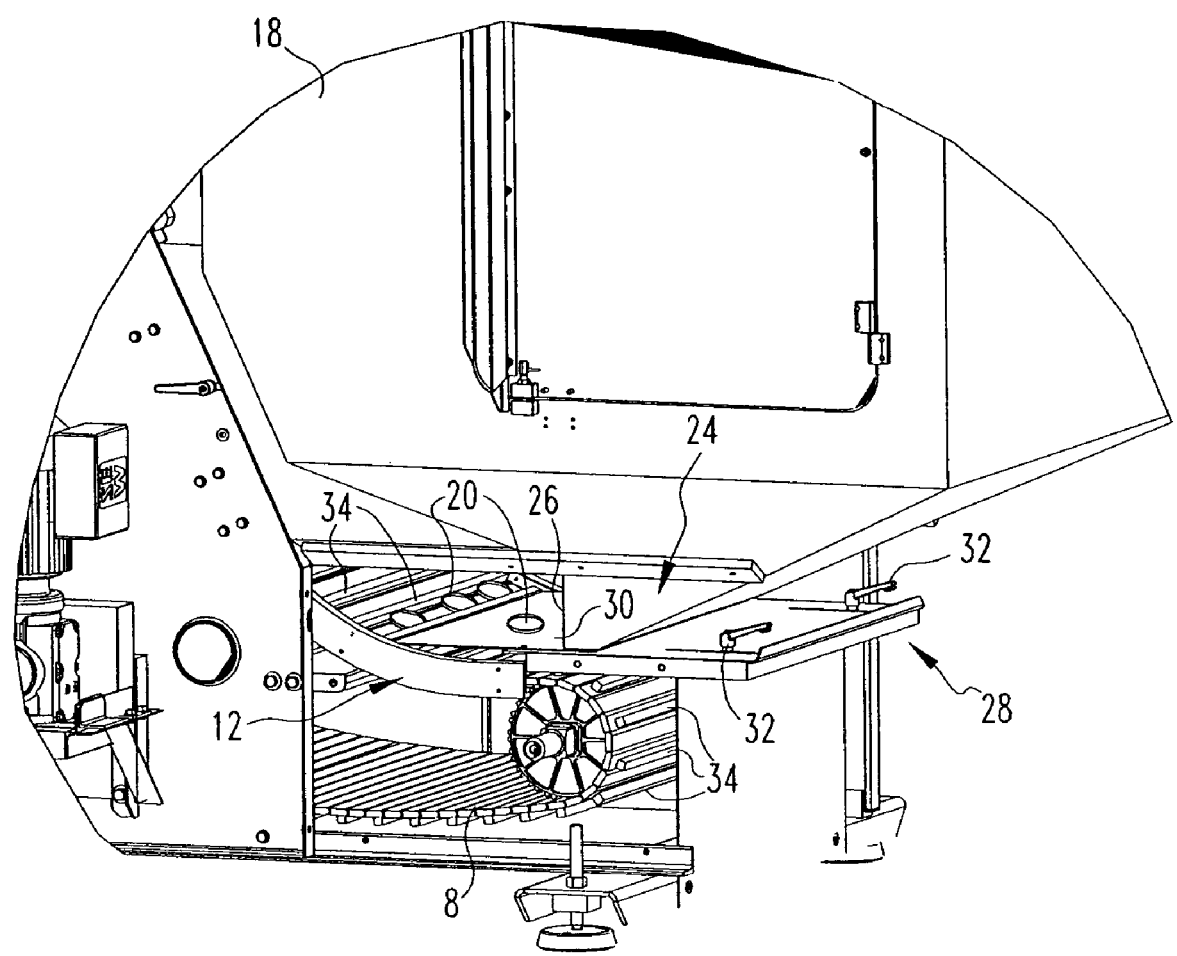
FIG. 3 is another isometric view of the adjustable spill-plate of FIG. 2 as employed on the object sorting and orienting apparatus of FIG. 1.

Referring now to FIG. 3, the exemplary extension 30 of the adjustable spill-plate 28 is flexible and further extends into the loading area 12 and contacts the flights 34 of the endless conveyor 8. As the flights 34 of the endless conveyor 8 rotate beneath the exemplary flexible extension 30, an intermittent pulse of the flexible extension 30 is generated. This intermittent pulse operates to facilitate substantially uniform distribution and dispensing of the closures 20 from the adjustable spill-plate 28 onto the endless conveyor 8 resulting in a closure loading rate that is substantially consistent throughout the entire operating range of the hopper 18 and the object fill-level 22 (FIG. 1), therein. To further facilitate regulated dispensing and distribution of the closures 20, the adjustable spill-plate 28, as described above, may be quickly adjusted both vertically (not shown) and horizontally, in order to, among other things, compensate for a variations in object fill-level 22 (FIG. 1) within the hopper 18 or other variations in the object dispensing rate caused, for example, by varying object weights, shapes and sizes (not shown).

It will be appreciated that the adjustable spill-plate extension 30 may be a separate piece attached to the adjustable spill-plate 28, as shown, or alternatively, it may merely be a unitary extension of the adjustable spill-plate 28 itself. Furthermore, it will be appreciated that the extension 30 need not be flexible, it could be rigid, and it need not contact the flights 34 in the loading area 12. An intermittent pulse to facilitate object dispersement could be created using other suitable means (e.g., without limitation, an actuator displacing the extension 30).

Figure 4:
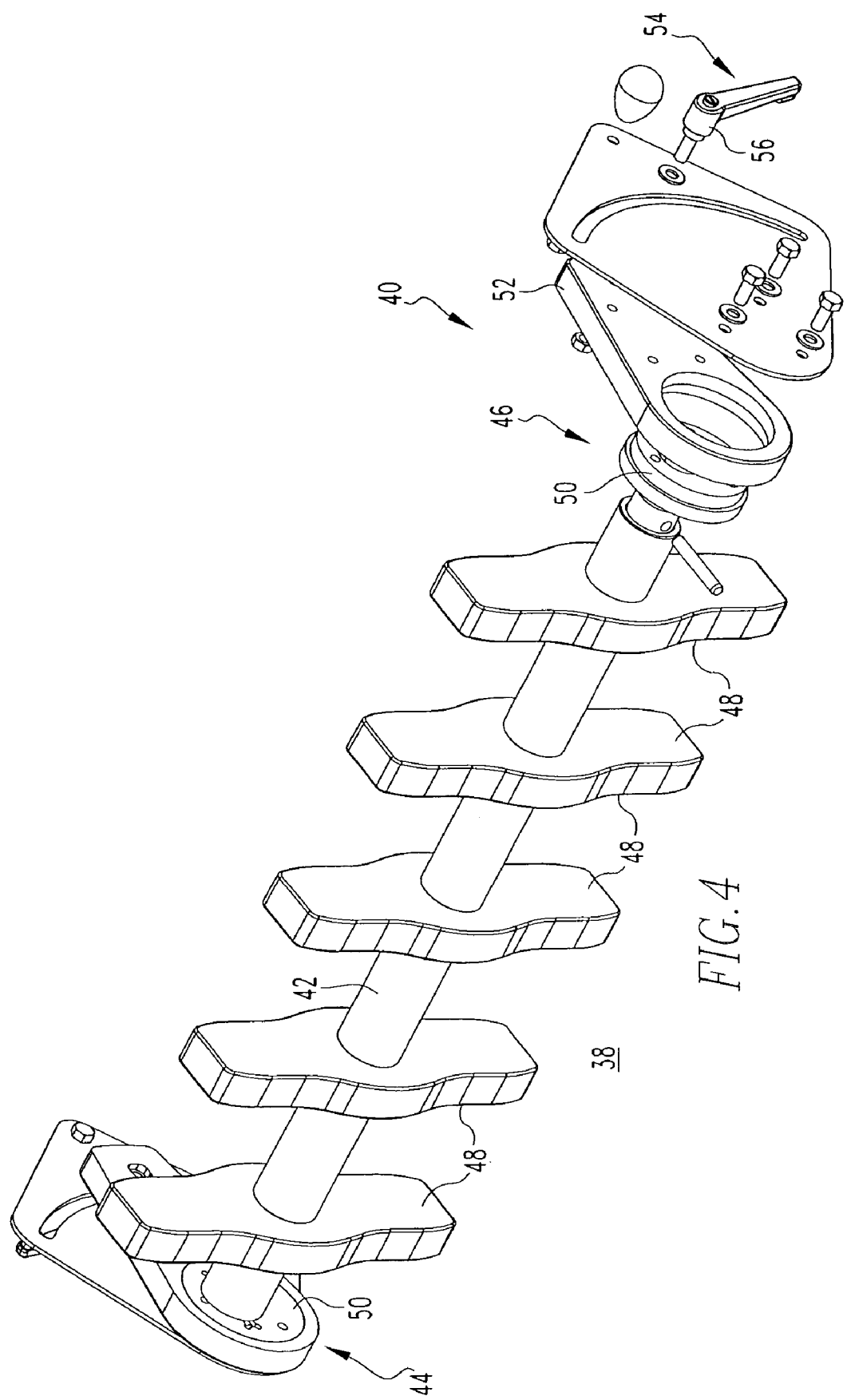
FIG. 4 is an exploded, isometric view of a belt path disrupter for use with the object sorting and orienting apparatus of FIG. 1.
Figure 5B:
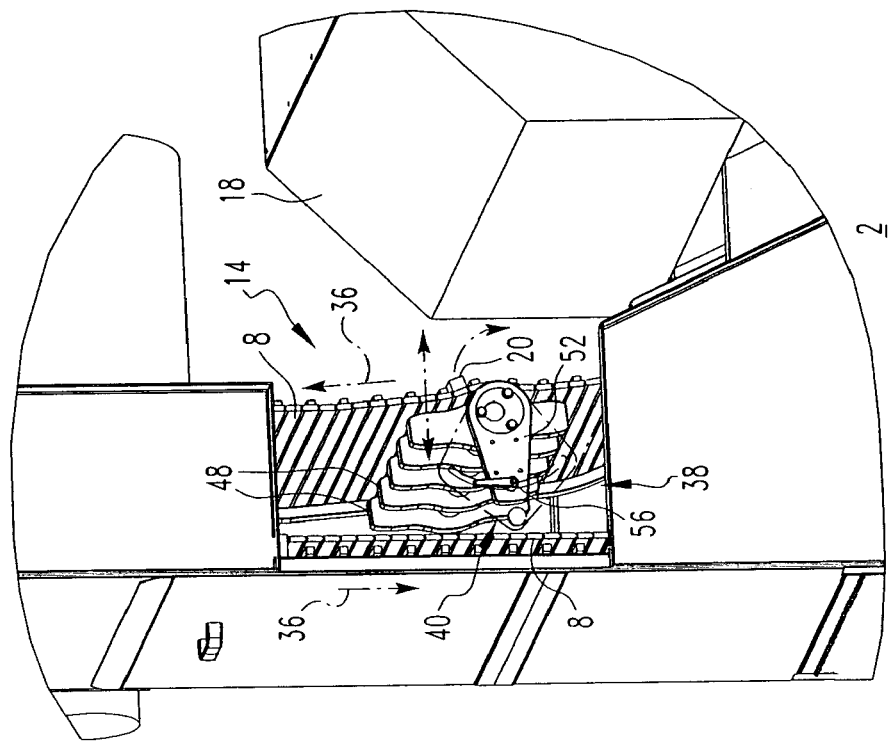
FIG. 5B is another isometric view of the belt path disruptor of FIG. 4 as employed with the object sorting and orienting apparatus of FIG. 1, with a portion of the apparatus cut-away to show internal structures.
Figure 5A:
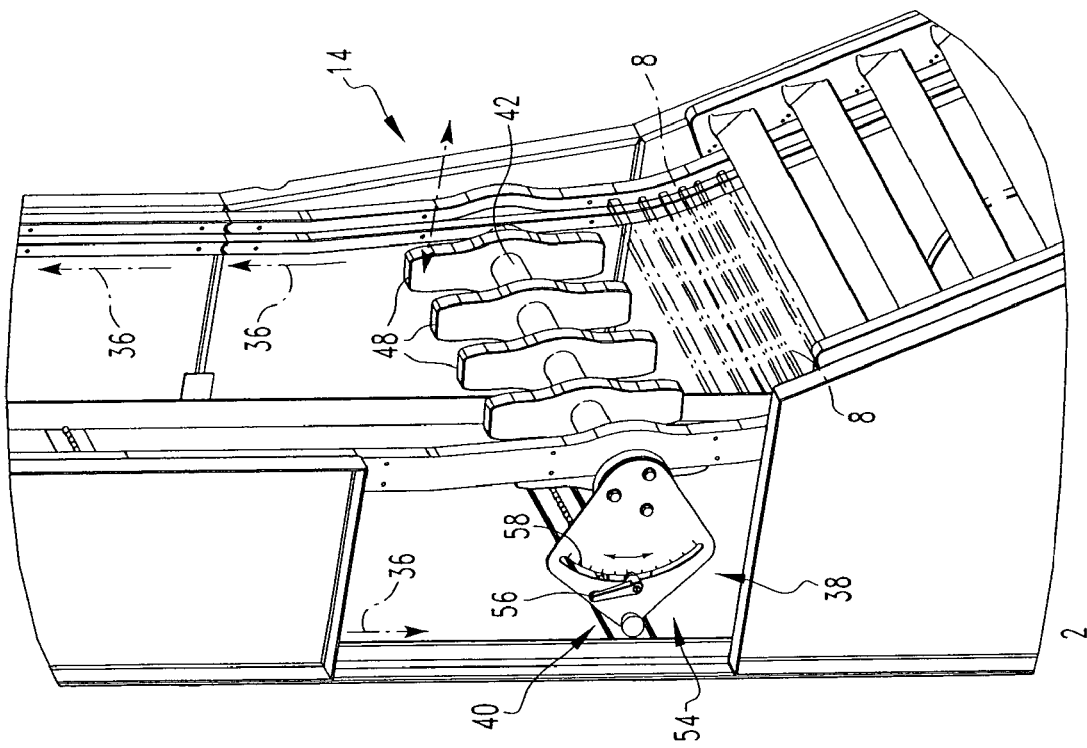
FIG. 5A is an isometric view of the belt path disrupter of FIG. 4 as employed with the object sorting and orienting apparatus of FIG. 1, with a portion of the apparatus cut-away and the endless conveyor shown in phantom line drawing to show internal structures.

FIG. 4 illustrates the belt path disrupter 38 used to displace the endless conveyor belt path 36 (FIGS. 5A and 5B), in order to sort and remove incorrectly oriented closures 20 (FIG. B) from the endless conveyor 8 (FIGS. 5A and 5B). As shown, the exemplary belt path disrupter 38 includes an adjustment device 40 comprising an eccentric shaft 42 having a first end 44, a second end 46 and a plurality of non-rotating guides 48 (five-non-rotating guides 48 are shown in FIG. 4) disposed therebetween. The first and second ends 44,46 of the eccentric shaft 42 are each housed in an eccentric 50. The eccentrics 50 are connected to an adjustor 52. The exemplary adjustor is a rotatable adjustor 52 which permits quick, tool-free adjustment or rotation through a range of approximately 90°, between minimum and maximum settings. Rotating the exemplary rotatable adjustor 52 rotates the eccentrics 50 which in turn displaces the eccentric shaft 42 and non-rotating guides 48 mounted thereon. When the non-rotating guides 48 are displaced, the belt path 36 (FIG. 5A) of the endless conveyor 8 is correspondingly displaced proximate the intermediate area 14 (best shown in FIG. 5B).

The belt path disrupter 38 further includes a locking device 54 such as, for example, the exemplary quick-release pin 56, in order to lock the adjustment device 40 in a position corresponding to the desired belt path displacement.

A significant benefit of the exemplary belt path disrupter 38 is that the belt path 36 (FIG. 5B) can be incrementally displaced, as desired, to improve sorting efficiency. Additionally, unlike known prior art designs, the exemplary non-rotating guides 48 have no bearings, lubrication points, sprockets, rotating parts or other high-maintenance and costly parts. Moreover, the exemplary adjustment device 40 permits fast, tool-free adjustment of the belt path disrupter 38.

FIGS. 5A and 5B show the exemplary belt path disrupter 38 as employed by the exemplary objects sorting and orienting apparatus 2. As shown, the exemplary non-rotating guides 48 are disposed adjacent the backside of the endless conveyor 8 (best shown in FIG. 5B) proximate the intermediate area 14 thereof. However, it will be appreciated that the belt path disruptor 38 could be disposed at any suitable alternative position along the endless conveyor 8. As described above, using the rotatable adjustor 52 (FIG. 5B), the eccentric shaft 42 (FIG. 5A) may be displaced thereby laterally displacing the non-rotating guides 48 and the belt path 36 of the endless conveyor 8.

Varying degrees of belt path displacement may be required to sort or remove incorrectly oriented objects 20 (FIG. 5B), depending on the particular object type, size and shape. Once the desired belt path displacement is obtained, the adjustment device 40 may be locked in place using the exemplary quick-release pin 56, shown. The adjustment device 40 may optionally further include a reference scale 58 (FIG. 5A) calibrated to a plurality of predetermined belt path displacement positions, in order to further simplify user adjustment. For example, each reference mark on the reference scale 58 (FIG. 5A) may correspond to a belt path position most appropriate for efficient sorting of a particular object size and type (not shown).

Figure 6:
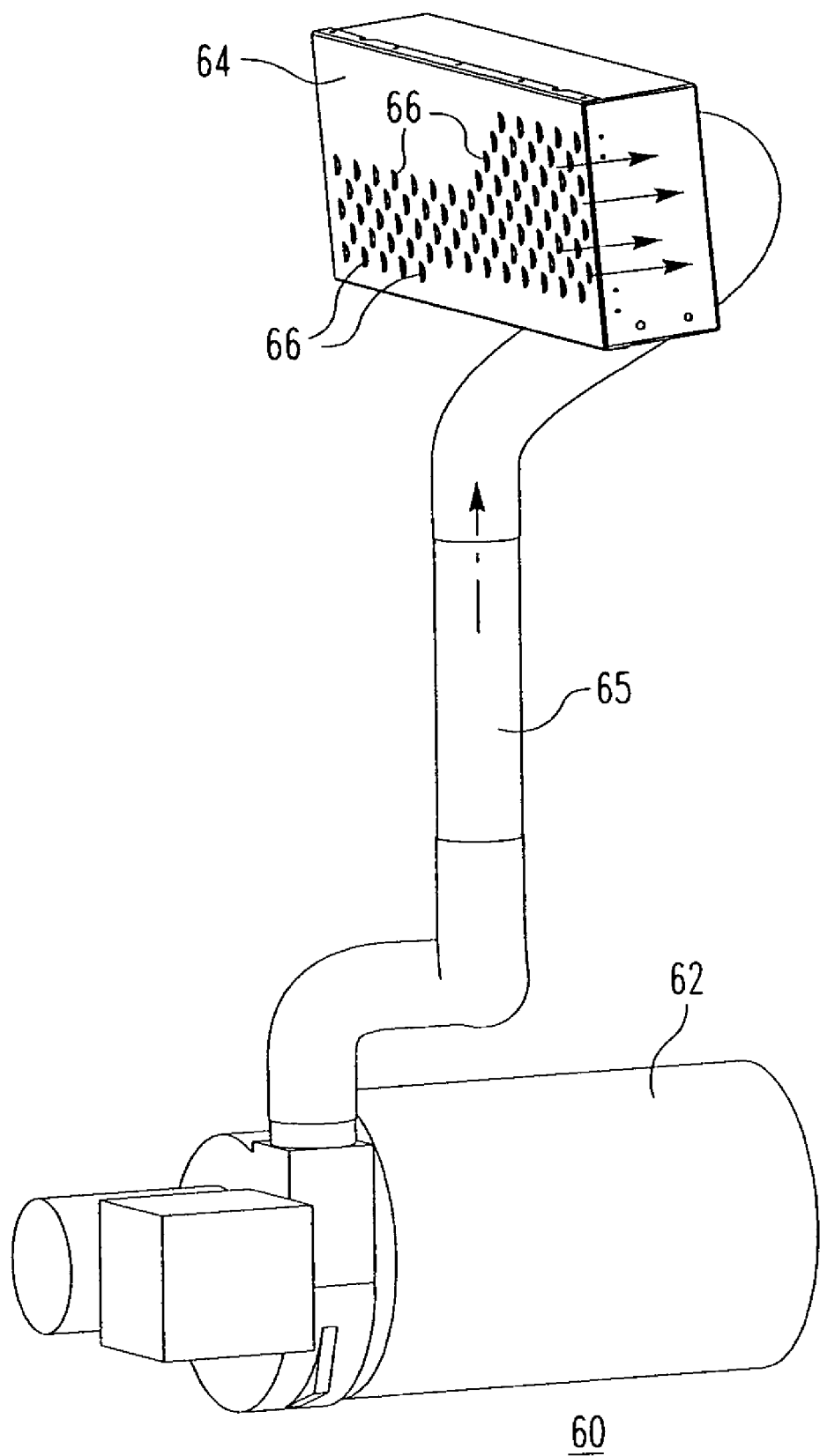
FIG. 6 is an isometric view of an air-conveyor for use with the object sorting and orienting apparatus of FIG. 1.
Figure 7:
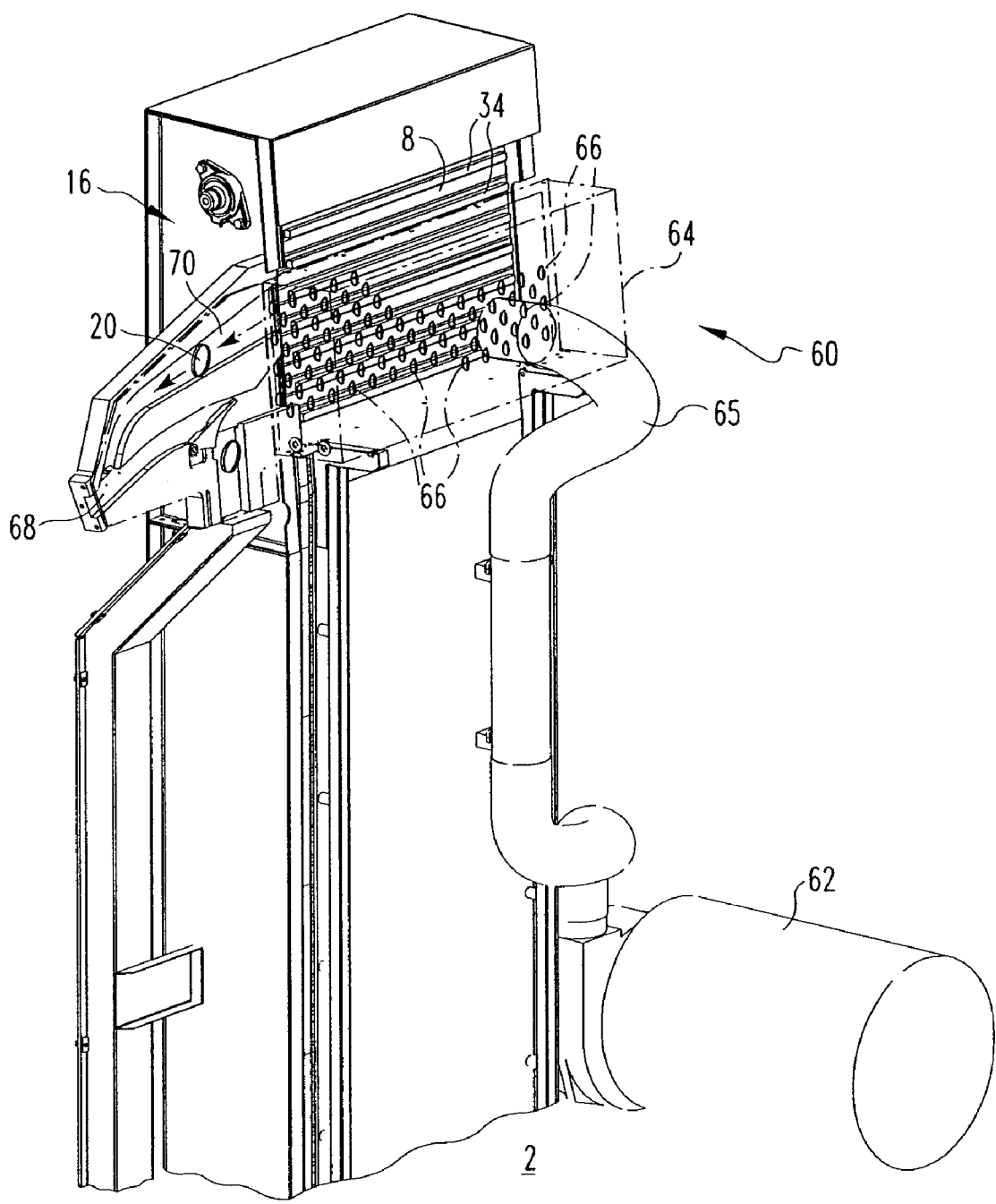
FIG. 7 is an isometric view of the air-conveyor of FIG. 6 as employed with the object sorting and orienting apparatus of FIG. 1, in accordance with the present invention, with portions of the exemplary air-conveyor shown in phantom line drawing.

FIG. 6 illustrates a removal device, such as the exemplary air-conveyor 60, for removing correctly oriented closures 20 (FIG. 7), from the endless conveyor 8 (FIG. 7). As shown, the exemplary air-conveyor 60 includes a high-volume, low-pressure four-sided plenum 64 pressurized by a blower 62. The exemplary blower 62 pressurizes the plenum 64 with air supplied through an air hose 65. The exemplary plenum 64 includes a plurality of directional louvers 66 in the plenum face closest to the endless conveyor 8 (FIG. 7), in order to urge correctly oriented closures 20 (FIG. 7) off of the endless conveyor 8 (FIG. 7) toward at least discharge chute 68,70 (FIG. 7) adjacent the discharge area 16 (FIG. 8) for discharge from the object sorting and orienting apparatus 2 (FIG. 7) via at least one of the at least discharge chutes 68,70,71 (best shown in FIGS. 8 and 9).

Known prior art sorting machines employ compressed-air nozzles (not shown) to remove correctly oriented objects from the endless conveyor. Such nozzles are high-pressure and are therefore noisy, inefficient and potentially unclean. For example, typical sorting apparatus require four or more compressed-air nozzles (not shown) at the discharge area to effectuate closure removal equivalent to the exemplary air-conveyor 60.

The exemplary air-conveyor 60 resolves these disadvantages by providing an efficient, high-speed method of removing closures 20 from the endless conveyor 8 while avoiding mechanical contact with the closures 20, thereby minimizing the potential for damage thereto. Additionally, the high-volume, low pressure air-conveyor 60 uses approximately forty-percent as much energy as a single ⅛" diameter compressed-air nozzle (not shown).

FIG. 7 illustrates the exemplary air-conveyor 60 as employed on the exemplary object sorting and orienting apparatus 2. As shown, the air-conveyor plenum 64 is disposed adjacent the endless conveyor 8 proximate the discharge area 16 with the exemplary directional control louvers 66 of the plenum 64 facing the flights 34 of the endless conveyor 8. As employed, a pressurized fluid source, such as, for example, the exemplary blower 62 pressurizes the four-sided air-conveyor plenum 64. The exemplary air-conveyor 60 employs high-volume, low-pressure air pressurization from the blower 62, which is directed into the plenum 64 through, for example, an air hose 65 and out through the exemplary directional louvers 66 (best shown in FIG. 6) to gently blow and remove correctly oriented closures 20 from the endless conveyor 8 for discharge through at least one of the at least one discharge chute 68,70,71 (three discharge chutes are shown in FIG. 7).

It will be appreciated that any suitable alternative pressurized fluid source (not shown) other than the exemplary blower 62, could alternatively be employed to pressurize the plenum 64 of the removal device. It will also be appreciated that a variety of plenum shapes and sizes (not shown) and alternative directional control mechanisms (not shown) other than the exemplary rectangular, four-sided plenum 64 and directional louvers 66, could be employed to facilitate removal of, for example closures 20 (FIG. 8), from the endless conveyor 8 (FIG. 8). It will further be appreciated that a wide variety of object removal devices (not shown) other than the exemplary air-conveyor 60 could alternatively be employed to facilitate such removal (e.g., without limitation, mechanical actuators; magnetic means).

FIG. 8 shows discharge mechanisms, such as, the exemplary primary and secondary discharge chutes 68,70 used to discharge correctly oriented objects, for example the exemplary correctly oriented closures 20 (FIG. 9) from the discharge area 16 of the object sorting and orienting apparatus 2 (FIG. 9) after being sorted and correctly oriented. As shown, each of the primary and secondary chutes 68,70 include an object-receiving end 72,76 proximate the discharge area 16 (FIG. 9) and an object-discharging end 74,78 opposite the object-receiving end 72,76.

Known prior art sorting machine discharge mechanisms are prone to jamming caused, for example, by an overload of correctly oriented closures all trying to enter the same discharge chute. Additionally, closures that fail to make it through the discharge chute often re-circulate through the sorting and orienting cycle, possibly causing closure damage or even contamination. The exemplary primary and secondary discharge chute 68,70 arrangement helps to overcome these problems. For example, among other jam-resisting features, a gate 80 in the secondary discharge chute 70 prevents overloading of the primary discharge chute 68, thereby providing further closure jamming-resistance.

As employed, correctly oriented objects 20 are discharged from the endless conveyor 8 (FIG. 9) by the air-conveyor 60 (FIG. 9) and directed single-file down the primary discharge chute 68, as shown. In order to avoid jamming, objects 20 unable to enter the primary discharge chute 68, for example, when too many correctly oriented objects 20 are simultaneously discharged, that they are unable to line up single-file, they are directed to the secondary discharge chute 70. A gate, such as the exemplary pneumatically activated (not shown) gate 80, shown, may be extended to retain these objects 20 in the secondary discharge chute 70, thereby further preventing jamming. The endless conveyor 8 (FIG. 9) may be periodically stopped and the gate 80 may be opened or retracted, in order to empty the closures 20 from the secondary discharge chute 70. A third, cleanout chute 71 may optionally be included for the purpose of quickly removing closures 20 from the sorting and orienting apparatus 2 (FIG. 9). A gateway 81 blocks the third, cleanout chute 71 during normal operation. However, the gateway 81 may be activated to block the primary discharge chute 68 and direct closures 20 down the cleanout chute 71 instead. This may be desirable in a variety of situations where it is necessary to quickly remove a plurality of closures 20 from the sorting and orienting apparatus 2 (e.g., without limitation, to remove a sampling of closures for inspection; to quickly reduce the number of sorted closures being discharged to the next processing station, without having to turn off the apparatus 2).

It will be appreciated that opening the gate 80 may be performed either mechanically, at user-specified intervals or through the use of, for example, sensors (e.g., without limitation, a photo-eye sensor, laser sensor or a mechanical contact) (not shown) triggered when a particular level of closures 20 is reached within the secondary chute 70 or alternatively using, for example, a computerized system (not shown). It will also be appreciated that any number of discharge chutes and gate mechanisms could alternatively be employed to facilitate jam-free discharge of correctly oriented objects. It will further be appreciated that each of the discharge chutes may be connected to any suitable chute discharge pathway or device (not shown) required for the next operation to be performed if any, on the closures 20.

Referring now to FIG. 9, the exemplary primary and secondary discharge chutes 68,70 and cleanout chute 71, are attached to the object sorting and orienting apparatus 2 adjacent the endless conveyor 8 in the discharge area 16 and proximate the exemplary air-conveyor 60. As described above, as employed, high-volume, low-pressure air discharged from the air-conveyor plenum 64 gently blows correctly oriented closures 20 from the endless conveyor towards the discharge chutes 68,70, 71. As described above, in order to prevent jamming, the exemplary primary discharge chute 68 receives correctly oriented closures 20 single-file and closures 20 that are unable to enter the primary discharge chute 68 enter the secondary discharge chute 70. Accordingly, closures 20 may enter the object-receiving ends 72,76 (FIG. 8) of both the primary and secondary chutes 68,70, respectively, but may only enter the third, cleanout chute 71 if the gateway 81 is open.

Depending on the intended future use of the correctly oriented closures 20, a variety of chute pathways or devices (not shown) may be attached to the object-discharging end 74 of the primary discharge chute 68, in order to guide the closures 20 to the desired location (i.e., without limitation to a capping machine) (not shown). As discussed above, the third, cleanout chute 71 may be used to quickly remove a plurality of closures 20 from the sorting and orienting apparatus 2 upon opening the gateway 81. For example, as shown, the third, cleanout chute may be connected to, for example, a cleanout chute pathway 79, which, for example, may run down the side of the exemplary sorting and orienting apparatus 2 to a container 83 to collect closures 20 exiting therefrom. As discussed above, this provides a means to immediately remove a plurality of closures 20 from the sorting and orienting apparatus 2 without having to employ additional equipment down stream or to stop the apparatus 2. The exemplary third, cleanout chute 71 and gateway 81 also serve the additional purpose of minimizing the likelihood that closures 20 will circulate through the sorting cycle more than once, thereby minimizing the associated likelihood of closure damage, or even contamination.

Figure 10:
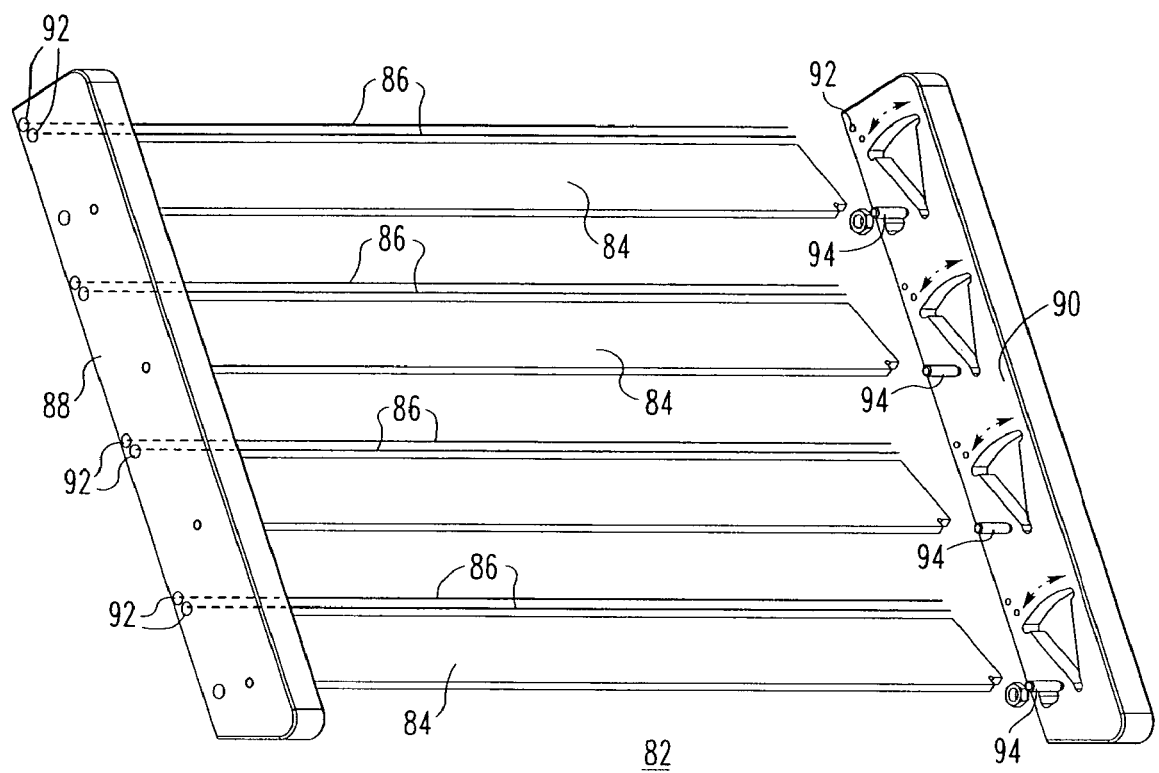
FIG. 10 is a partially exploded isometric view of a deflector mechanism for use with the object sorting and orienting apparatus of FIG. 1.
Figure 11:
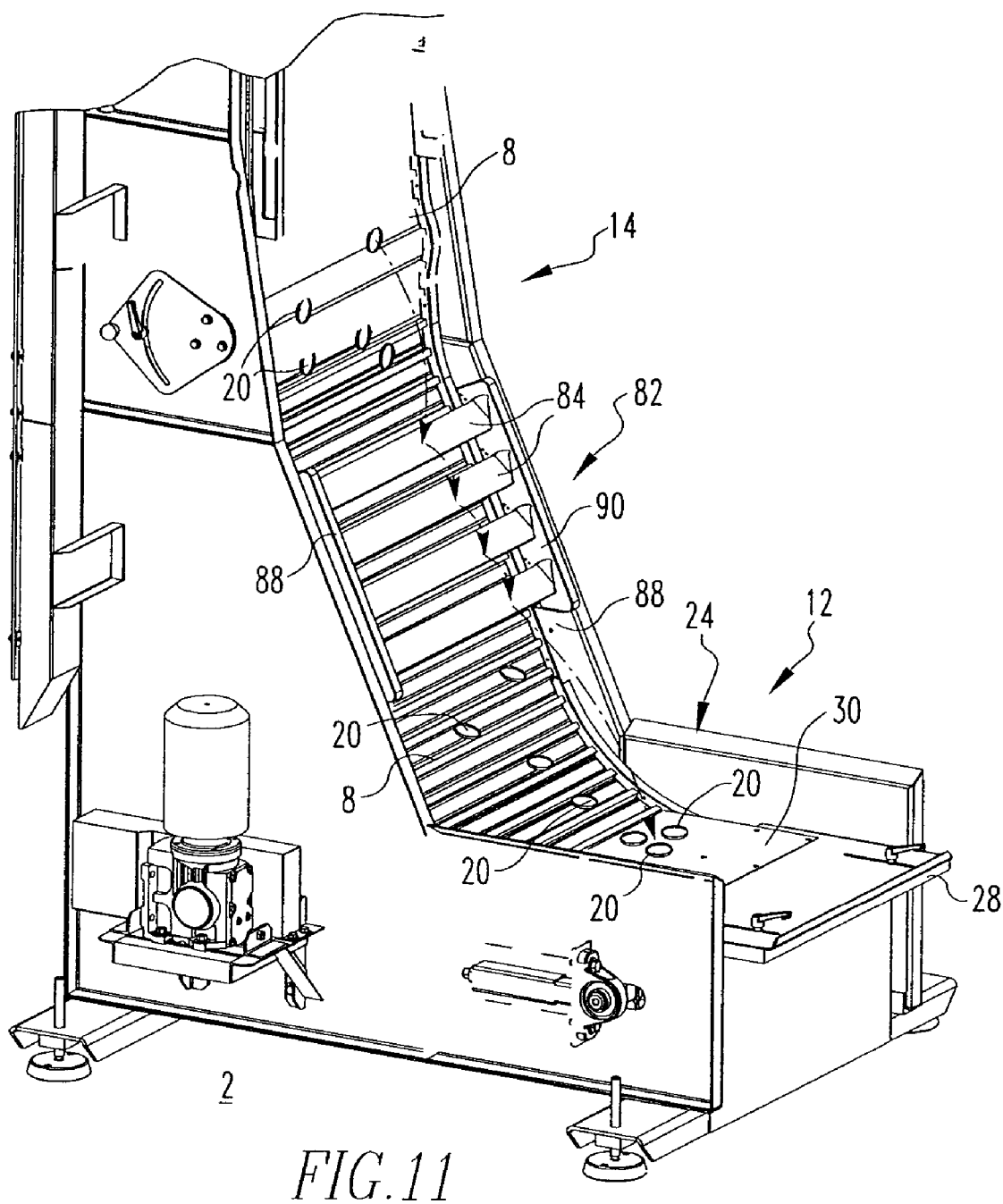
FIG. 11 is an isometric view of the deflecting mechanism of FIG. 10 as employed on the object sorting and orienting apparatus of FIG. 1, in accordance with the present invention, with portions of the object sorting and orienting apparatus removed to better show features of the invention.

FIG. 10 illustrates a deflecting mechanism 82 for further facilitating objects, such as, closures 20 (FIG. 11).

As discussed above, known prior art sorting machines employ a variety of mechanisms to remove incorrectly oriented closures from the endless conveyor. Removed closures, or those that otherwise fall from the endless conveyor often drop onto another portion of the endless conveyor therebelow, for example, proximate the loading area. These falling closures can knock off and even damage closures being loaded onto and transported by the endless conveyor, thereby greatly reducing the efficiency of the sorting machine.

The deflecting mechanism 82 employed by the exemplary sorting and orienting apparatus 2 (FIG. 11) serves to overcome these disadvantages. As shown, the exemplary deflecting mechanism 82 employs a plurality of deflectors, such as, for example the exemplary rotating louvers 84 and elastic cords 86, in order to prevent falling closures 20 (FIG. 11), falling from the substantially vertical portion of the endless conveyor 8 (FIG. 11), from hitting and knocking off closures 20 on a different portion of the endless conveyor 8 (FIG. 11) therebelow. The exemplary louvers 84 and elastic cords 86 are disposed between two side walls 88,90. The side walls 88,90 include a plurality of holes 92 through which the elastic cords 86 are threaded. The exemplary rotating louvers 84 freely rotate around a pivot member 94 extending between each side wall 88,90 and the base of each louver 84, as shown. While the exemplary louvers 84 pivot freely, in order to permit closures 20, in a variety of arrangements (not shown) to pass on the endless conveyor 8 therebeneath, it will be appreciated that the louvers could alternatively be substantially fixed in position and adjusted tool-free by rotating the louvers 84 about the pivot members 94 to adjust the louvers 84 in relation to the endless conveyor 8 (FIG. 11) therebelow. It will also be appreciated that any number and combination of suitable deflectors (not shown) other than the exemplary rotating louvers 84 and elastic cords 86 could alternatively be employed to deflect falling closures 20 (FIG. 11).

Referring now to FIG. 11, the exemplary deflecting mechanism 82 is employed on the exemplary object sorting and orienting apparatus 2 proximate the intermediate area 14 just above the loading area 12, in order to deflect closures 20 that fall from the endless conveyor 8, away from closures 20 being dispersed and loaded onto the endless conveyor 8 within the loading area 12 therebelow. As employed, the elastic cords 86 (FIG. 10) and rotating louvers 84 allow any arrangement of incorrectly oriented closures 20 to pass through, on the endless conveyor 8 underneath the deflecting mechanism 82, but, when a closure 20 above the deflecting mechanism 82 falls off the endless conveyor 8, it is deflected away from the endless conveyor 8 below, as it bounces from louver 84 to louver 84 and ultimately back onto the adjustable spill-plate 28.

The exemplary deflecting mechanism 82 may be adjusted in relation to its position on the sorting and orienting apparatus 2, and particularly, with respect to its distance from the endless conveyor 8, in order to sufficiently deflect objects having a variety of different sizes and shapes (not shown) away from objects being transported on a different portion of the endless conveyor 8 therebelow, while permitting objects to pass underneath as they are transported up the endless conveyor 8. As described above, such adjustment may be accomplished without the use of tools. It will be appreciated that any suitable adjustment mechanism (not shown) could be employed to adjust the deflecting mechanism 82. It will also be appreciated that a suitable alternative deflecting mechanism (not shown) could be employed or alternatively, that the deflecting mechanism 82 may be removed from the sorting and orienting apparatus 2 altogether (not shown).

Preventing falling closures 20 from knocking off closures 20 being dispensed and loaded within the loading area 12, maximizes the number of closures 20 able to be transported from the loading area 12 to the discharge area 16 (FIG. 1), and thereby greatly improves sorting and orienting efficiency. Moreover, as described above, the deflecting mechanism 82 may optionally deflect such falling closures 20 back into the adjustable spill-plate 28 for correct dispersement onto the endless conveyor 8 within the loading area 12, thereby improving efficiency even further. The exemplary deflecting mechanism 82 also minimizes the possibility of damage being caused as a result of falling closures 20.

Accordingly, the present invention provides an improved, efficient object sorting and orienting apparatus 2 that, among other things, reduces the number of high maintenance, unnecessary complex and expensive parts, provides tool-free adjustment to accommodate a wide variety of objects having a wide array of shapes and sizes, provides regulated object dispersement and distribution throughout an entire sorting run and which provides jam-free discharge and delivery of correctly oriented and sorted objects.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof.

What is claimed is:

1. An object sorting and orienting apparatus comprising:
a hopper for receiving and dispensing a plurality of randomly oriented objects, said plurality of objects defining an object-fill level within said hopper;
an endless conveyor rotating through a loading area, a discharge area and an intermediate area therebetween, said endless conveyor receiving said objects at said loading area and transporting said objects to said discharge area, each said object being loaded onto said endless conveyor in one of a correct orientation and an incorrect orientation;
at least one regulator for regulating the effects of variations in said object fill-level within said hopper during a sorting run;
orienting means for arranging said objects in said correct orientation;
sorting means for sorting said incorrectly oriented objects from said correctly oriented objects; and
discharge means for discharging said correctly oriented objects from said discharge area.

2. The object sorting and orienting apparatus of claim 1 wherein said orienting means includes a plurality of flights disposed on said endless conveyor, said flights being structured to receive a plurality of said objects in said correct orientation.

3. The object sorting and orienting apparatus of claim 2 wherein said plurality of flights include a plurality of substantially parallel and equally spaced transverse projections disposed across said endless conveyor; and wherein said correctly oriented objects may be transported on said endless conveyor between a pair of said substantially parallel and equally spaced transverse projections.

4. The object sorting and orienting apparatus of claim 1 wherein said endless conveyor has a belt path; wherein said belt path is substantially vertical between at least said intermediate and said discharge areas; wherein said sorting means includes a belt path disruptor structured to displace said belt path proximate said intermediate area; and wherein said belt path disruptor and gravity, induced by said substantially vertical belt path, facilitate removal of said incorrectly oriented objects from said endless conveyor.

5. The object sorting and orienting apparatus of claim 4 wherein said sorting and orienting apparatus has a height; and wherein the substantially vertical nature of said belt path permits adjustment of the height of said sorting and orienting apparatus while maintaining a substantially uniform sorting and orienting apparatus footprint.

6. The object sorting and orienting apparatus of claim 1 wherein said plurality of randomly oriented objects is a plurality of container closures.

7. An object sorting and orienting apparatus comprising:
a hopper for receiving and dispensing a plurality of randomly oriented objects, said plurality of objects defining an object-fill level within said hopper;
an endless conveyor rotating through a loading area, a discharge area and an intermediate area therebetween, said endless conveyor receiving said objects at said loading area and transporting said objects to said discharge area, each said object being loaded onto said endless conveyor in one of a correct orientation and an incorrect orientation;
at least one regulator for regulating the effects of variations in said object fill-level within said hopper during a sorting run;
orienting means for arranging said objects in said correct orientation;
sorting means for sorting said incorrectly oriented objects from said correctly oriented objects; and
discharge means for discharging said correctly oriented objects from said discharge area,
wherein said at least one regulator includes a hopper discharge forming an opening in said hopper structured to controllably dispense said randomly oriented objects from said hopper into said loading area.

8. The object sorting and orienting apparatus of claim 7 wherein said at least one regulator further includes an adjustable spill-plate disposed between said opening in said hopper and said endless conveyor, said adjustable spill-plate being adjustable in order to further facilitate regulated dispensing of said objects onto said endless conveyer within said loading area.

9. The object sorting and orienting apparatus of claim 8 wherein said orienting means further includes an extension of said adjustable spill-plate; and wherein said extension further extends into said loading area to facilitate loading of said objects onto said endless conveyor.

10. The object sorting and orienting apparatus of claim 9 wherein said extension of said adjustable spill-plate contacts said flights of said endless conveyor as said endless conveyor travels therebeneath; and wherein said flights of said endless conveyor send an intermittent pulse through said extension as said endless conveyor travels therebeneath, thereby facilitating uniform distribution of said objects from said adjustable spill-plate onto said endless conveyor within said loading area.

11. An object sorting and orienting apparatus comprising:
a hopper for receiving and dispensing a plurality of randomly oriented objects, said plurality of objects defining an object-fill level within said hopper;
an endless conveyor rotating through a loading area, a discharge area and an intermediate area therebetween, said endless conveyor receiving said objects at said loading area and transporting said objects to said discharge area, each said object being loaded onto said endless conveyor in one of a correct orientation and an incorrect orientation;
at least one regulator for regulating the effects of variations in said object fill-level within said hopper during sorting run;
orienting means for arranging said objects in said correct orientation;
sorting means for sorting said incorrectly oriented objects from said correctly oriented objects; and
discharge means for discharging said correctly oriented objects from said discharge area,
wherein said endless conveyor has a belt path, wherein said belt path is substantially vertical between at least said intermediate and said discharge areas, wherein said sorting means includes a belt path disruptor structured to displace said belt path proximate said intermediate area, wherein said belt path disruptor and gravity, induced by said substantially vertical belt path, facilitate removal of said incorrectly oriented objects from said endless conveyor, wherein said belt path disruptor includes an adjustment device comprising an eccentric shaft having a first end, a second end and a plurality of non-rotating guides disposed therebetween, and wherein said eccentric shaft displaces said non-rotating guides when said eccentric shaft is adjusted, thereby displacing said belt path of said endless conveyor.

12. The object sorting and orienting apparatus of claim 11 wherein said adjustment device further includes an adjustor, for adjusting said eccentric shaft, and a locking device for locking said belt path disruptor in a position corresponding to a desired belt path displacement.

13. The object sorting and orienting apparatus of claim 12 further including a reference scale in order to facilitate user adjustment and locking of said adjustment device in a position corresponding to one of a plurality of predetermined corresponding belt path displacement positions.

14. An object sorting and orienting apparatus comprising:
a hopper for receiving and dispensing a plurality of randomly oriented objects, said plurality of objects defining an object-fill level within said hopper;
an endless conveyor rotating through a loading area, a discharge area and an intermediate area therebetween, said endless conveyor receiving said objects at said loading area and transporting said objects to said discharge area, each said object being loaded onto said endless conveyor in one of a correct orientation and an incorrect orientation;
at least one regulator for regulating the effects of variations in said object fill-level within said hopper during sorting run;
orienting means for arranging said objects in said correct orientation;
sorting means for sorting said incorrectly oriented objects from said correctly oriented objects; and
discharge means for discharging said correctly oriented objects from said discharge area,
wherein said discharge means includes at least one discharge chute proximate said discharge area and a removal device for removing said correctly oriented objects from said endless conveyor for discharge from said sorting and orienting apparatus via at least one of said at least one discharge chute.

15. The object sorting and orienting apparatus of claim 14 wherein said removal device is an air-conveyor for removing said correctly oriented objects from said endless conveyor without mechanical contact, thereby minimizing the potential for damage to said objects.

16. The object sorting and orienting apparatus of claim 15 wherein said air-conveyor includes a blower mounted proximate said discharge area for pressurizing a plenum mounted adjacent said endless conveyor; and wherein said plenum utilizes high-volume, low-pressure pressurization and directional control to controllably remove said correctly oriented objects from said endless conveyor.

17. The object sorting and orienting apparatus of claim 16 wherein said directional control is provided by a plurality of directional louvers disposed in the portion of said plenum facing said endless conveyor; and wherein high-volume, low-pressure air passing through said directional louvers moves said correctly oriented objects from said endless conveyor toward one of said at least one discharge chute.

18. The object sorting and orienting apparatus of claim 14 wherein at least one of said at least one discharge chute receives and discharges said correctly oriented objects single-file, in order to minimize jamming of said objects.

19. The object sorting and orienting apparatus of claim 14 wherein said at least one discharge chute includes a primary discharge chute and a secondary discharge chute; wherein each of said primary and secondary chutes has an object-receiving end proximate said discharge area and an object-discharging end opposite said object-receiving end; and wherein said secondary discharge chute may receive objects that are unable to enter said primary discharge chute.

20. The object sorting and orienting apparatus of claim 19 wherein said secondary discharge chute further includes at least one gate structured to further minimize the likelihood of object jamming.

21. The object sorting and orienting apparatus of claim 20 wherein at least one of said at least one gate may be structured to temporarily retain a plurality of objects within said secondary discharge chute; wherein said endless conveyor may be stopped and said at least one of said at least one gate may be opened to periodically empty said objects from said secondary discharge chute when it is full of said objects.

22. The object sorting and orienting apparatus of claim 19 wherein said at least one discharge chute further includes a third, cleanout chute structured to discharge objects from said sorting and orienting apparatus without requiring said endless conveyor to be stopped.

23. The object sorting and orienting apparatus of claim 22 wherein said third, cleanout chute further includes a gateway operable to block said primary discharge chute, in order to direct said objects down said third, cleanout discharge chute.

24. An object sorting and orienting apparatus comprising:
a hopper for receiving and dispensing a plurality of randomly oriented objects, said plurality of objects defining an object-fill level within said hopper;
an endless conveyor rotating through a loading area, a discharge area and an intermediate area therebetween, said endless conveyor receiving said objects at said loading area and transporting said objects to said discharge area, each said object being loaded onto said endless conveyor in one of a correct orientation and an incorrect orientation;
at least one regulator for regulating the effects of variations in said object fill-level within said hopper during a sorting run;
orienting means for arranging said objects in said correct orientation;
sorting means for sorting said incorrectly oriented objects from said correctly oriented objects; and
discharge means for discharging said correctly oriented objects from said discharge area,
wherein said sorting means further includes a deflecting mechanism proximate said loading area, said deflecting mechanism having a plurality of deflectors in order to prevent objects falling from said endless conveyor from hitting and knocking off objects on a different portion of said endless conveyor therebelow, thereby maximizing the number of objects dispensed and distributed onto said endless conveyor for transport from said loading area to said discharge area.

25. The object sorting and orienting apparatus of claim 24 wherein said plurality of deflectors include a plurality of devices selected from the group consisting of louvers and elastic cords.

26. The object sorting and orienting apparatus of claim 24 wherein said deflecting mechanism deflects said falling objects back into said loading area for correct distribution onto said endless conveyor.

27. A closure sorter and orienter comprising:

a hopper for receiving and dispensing a plurality of randomly oriented closures, said plurality of closures defining an object fill-level within said hopper;

an endless conveyor rotating through a loading area, a discharge area and an intermediate area therebetween, said endless conveyor receiving said closures in said loading area and transporting said closures to said discharge area, each said closure being loaded onto said endless conveyor in one of a correct orientation and an incorrect orientation;

at least one regulator for regulating the effects of variations in said object fill-level within said hopper during a sorting run, said at least one regulator including a hopper discharge forming an opening in said hopper for controllably dispensing said closures from said hopper, and, an adjustable spill-plate for further regulating dispensing and distribution of said closures onto said endless conveyor within said loading area;

orienting means for arranging said closures in said correct orientation, said orienting means including a plurality of flights disposed on said endless conveyor for receiving a plurality of said correctly oriented closures, and, an extension for said adjustable spill-plate, said extension communicating with said hopper discharge and said flights of said endless conveyor in order to facilitate uniform distribution of said closures from said adjustable spill-plate onto said endless conveyor for transport from said loading area to said discharge area;

sorting means for sorting said correctly oriented closures from said incorrectly oriented closures, said sorting means including a belt path disruptor proximate said intermediate area, in order to displace said endless conveyor thereby removing said incorrectly oriented closures therefrom, gravity further facilitating such removal; and discharge means for discharging said correctly oriented closures from said discharge area of said sorting and orienting apparatus, said discharge means including a removal device adjacent said endless conveyor and at least one discharge chute for receiving and discharging said correctly oriented closures single-file, said removal device removing said correctly oriented closures from said endless conveyor and guiding said closures into at least one of said at least one discharge chute for discharge therethrough.

28. The closure sorter and orienter of claim 27 wherein said sorter and orienter may be adjusted without the use of tools, in order to sort closures having a wide array of shapes and sizes.

29. The closure sorter and orienter of claim 27 wherein said sorter and orienter is structured to sort and orient closures which are bottle caps.

30. The closure sorter and orienter of claim 27 wherein said sorter and orienter is structured to sort and orient closures which are jar closures.

* * * * *